United States Patent [19]

Honaga et al.

[11] Patent Number: 4,632,204
[45] Date of Patent: Dec. 30, 1986

[54] POWER ASSISTED STEERING SYSTEM

[75] Inventors: Susumu Honaga; Mikio Suzuki; Yoshiharu Inaguma, all of Kariya; Hiroki Sato, Toyota; Kenichi Kikuchi, Toyota; Masato Tanabe, Toyota, all of Japan

[73] Assignee: Toyota Jidosha Kabushiki Kaisha, Aichi, Japan

[21] Appl. No.: 747,921

[22] Filed: Jun. 24, 1985

[30] Foreign Application Priority Data

Jun. 29, 1984 [JP] Japan ................. 59-137586

[51] Int. Cl.$^4$ ............................. B62D 5/08
[52] U.S. Cl. ..................... 180/142; 60/430; 60/486; 91/371; 91/375 A; 180/143; 180/149; 251/30.02
[58] Field of Search ............... 180/142, 132, 133, 141, 180/143, 149, 79.1; 60/375 A, 376 A, 428, 430, 486; 91/6, 31, 369, 371, 375 R, 375 A; 251/30.02

[56] References Cited

U.S. PATENT DOCUMENTS 4,410,059 10/1983 Nakayama et al. ........... 180/142 X

FOREIGN PATENT DOCUMENTS 2141083 12/1984 United Kingdom ............... 180/143
2140753 12/1984 United Kingdom ............... 180/143

Primary Examiner—John J. Love
Assistant Examiner—Mitchell J. Hill
Attorney, Agent, or Firm—Parkhurst & Oliff

[57] ABSTRACT

A power assisted steering system of the type which includes a hydraulic reaction mechanism for controlling the hydraulic power assist in accordance with an increase or decrease of the vehicle speed. The system includes primary and secondary hydraulic pumps, the primary pump having the function of applying hydraulic pressure to the power cylinder and the secondary pump having the function of applying hydraulic pressure to the reaction mechanism in proportion to the vehicle speed. The secondary pump is unitedly assembled with the primary pump to be driven by the prime mover, and comprises a first control valve for controlling the quantity of fluid applied to the reaction mechanism for the secondary pump in a constant amount, and a second control valve for controlling the pressure of fluid controlled by the first control valve in accordance with the vehicle speed.

6 Claims, 6 Drawing Figures

POWER ASSISTED STEERING SYSTEM

BACKGROUND OF THE INVENTION

The present invention relates to a power assisted steering system for providing a hydraulic power assist to the driver's steering effort applied to the steering wheel of an automotive vehicle, and more particularly to a power assisted steering system of the type which includes a hydraulic reaction mechanism for controlling the hydraulic power assist in accordance with increase or decrease of the vehicle speed.

In a conventional power assisted steering system of this type, the hydraulic reaction mechanism is connected to a secondary hydraulic pump to be applied with a hydraulic pressure in proportion to the vehicle speed. In general, the secondary hydraulic pump is in the form of a hydraulic pump driven by a propeller shaft of the vehicle. Alternatively, the secondary hydraulic pump is in the form of a hydraulic pump associated with a primary hydraulic pump for the steering system to apply the hydraulic pressure to the reaction mechanism. However, the former type of hydraulic pump must be mounted on the propeller shaft and connected to the reaction mechanism by means of fluid conduits. This results in complicated construction of the steering system. In the latter type of hydraulic pump, it is necessary to avoid mutual interference between the hydraulic pressures respectively applied to the power cylinder and the reaction mechanism. This results in complicated construction of a control apparatus for the hydraulic pumps.

SUMMARY OF THE INVENTION

It is, therefore, a primary object of the present invention to provide a power assisted steering system wherein the secondary hydraulic pump for the reaction mechanism is unitedly assembled with the primary hydraulic pump for the steering system in a relatively simple construction without causing any interference between the hydraulic pressures respectively applied to the power cylinder and the reaction mechanism.

According to the present invention briefly summarized, the primary object is attained by providing a power assisted steering system for an automotive vehicle having a primary hydraulic pump assembly driven by a prime mover of the vehicle for supply of fluid under pressure, a secondary hydraulic pump assembly for supply of fluid under pressure in proportion to the vehicle speed, a hydraulic power cylinder operatively connected to the steerable road wheels of the vehicle, a servo valve assembly including an input member operatively connected to the steering wheel of the vehicle, an output member operatively connected to the power cylinder, and valve means for controlling the supply of fluid under pressure from the primary hydraulic pump assembly to the power cylinder in response to relative rotation between the input and output members, and a reaction mechanism associated with the servo valve assembly and connected to the secondary hydraulic pump assembly to effect a resistance to relative rotation between the input and output members in accordance with a hydraulic pressure applied thereto from the secondary hydraulic pump, wherein the secondary hydraulic pump assembly is unitedly assembled with the primary hydraulic pump assembly to be driven by the prime mover of the vehicle and comprises first control valve means for controlling the quantity of fluid discharged from the secondary hydraulic pump in a constant amount, and second control valve means for controlling the pressure of fluid controlled by the first control valve means in accordance with the vehicle speed.

BRIEF DESCRIPTION OF THE DRAWINGS

Other objects and attendant advantages of the present invention will become more readily apparent from the following detailed description of a preferred embodiment thereof when considered in connection with the attached drawings, in which.

DETAILED DESCRIPTION OF THE PREFERRED EMBODIMENT

Figure 1:
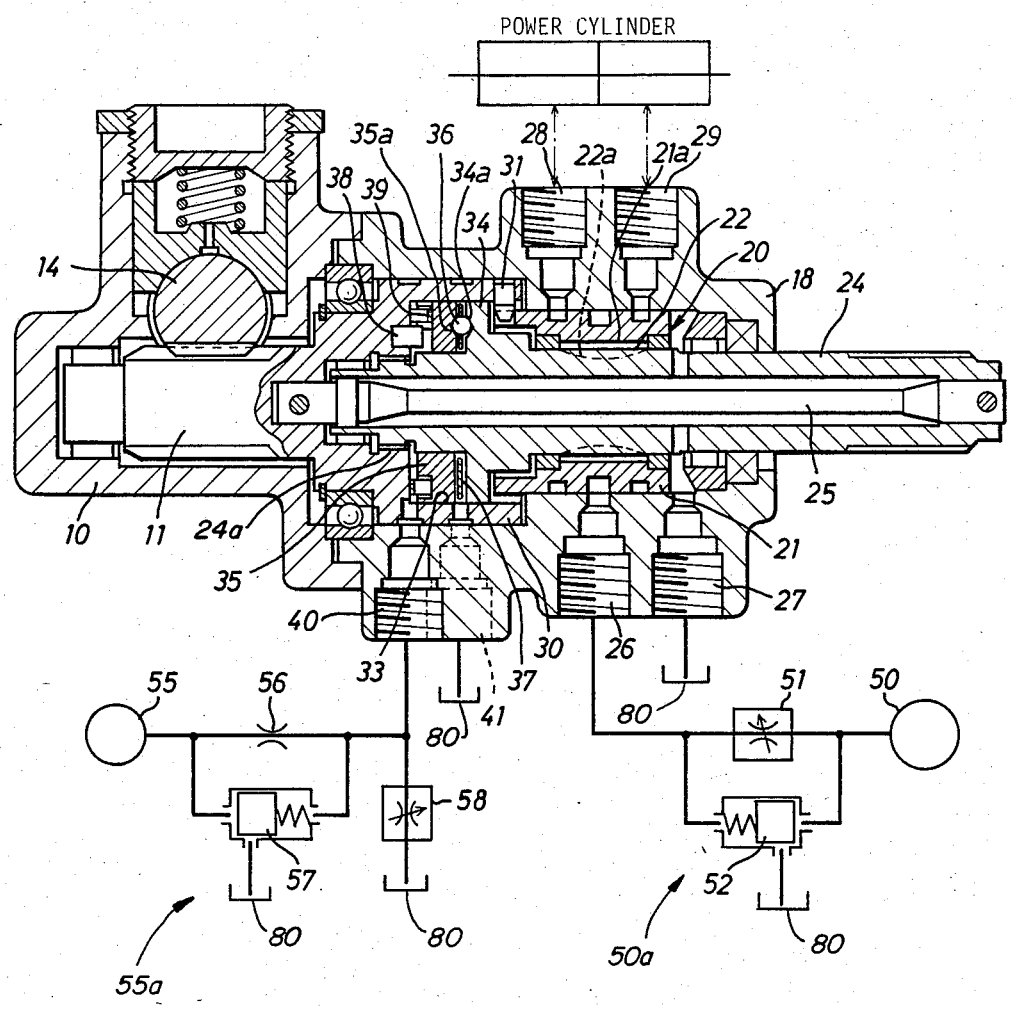
FIG. 1 is a sectional view of a power assisted steering apparatus and schematically illustrates a primary hydraulic pump and a secondary hydraulic pump connected to the power assisted steering apparatus.

Referring now to the drawings, FIG. 1 illustrates a power assisted steering apparatus of the rack and pinion type which comprises a gear housing 10 that has an output member 11 in the form of a pinion shaft rotatably mounted therein and permanently meshed with a rack member 14. The rack member 14 is movable in a direction perpendicular to the pinion shaft 11 and is connected in a usual manner to a power piston in a hydraulic power cylinder as is schematically illustrated in the figure. The rack member 14 is further operatively connected to the steerable road wheels of the vehicle through a conventional linkage mechanism (not shown). The gear housing 10 is integrally secured to a valve housing 18 that has a rotary type servo valve assembly 20 mounted therein. The servo valve assembly 20 includes an input member 24 in the form of a shaft coaxially arranged with the pinion shaft 11 for relative rotation therewith and adapted to be connected to the steering shaft (not shown) of the vehicle in which the power assisted steering apparatus is mounted.

An intermediate portion of the input member 24 is formed as a valve rotor 22 which is coupled within a valve sleeve 21 for relative rotation therewith. The input member 24 is connected to the output member 11 by means of a torsion bar 25 and is engaged at 24a with the output member 11 in such a way as to permit relative rotation therebetween. The valve rotor 22 is formed in its outer circumference with a plurality of circumferentially equi-spaced axial grooves 22a of semi-circular cross-section and is formed therein with a plurality of radial passages (not shown) which communicate a part of the axial grooves 22a into an internal axial bore in the input shaft 24. The valve sleeve 21 is arranged in surrounding relationship with the valve rotor 22 and connected to the inner end of pinion shaft 11 by means of a connecting pin 31. The valve sleeve 21 is formed in its inner circumference with a plurality of circumferentially equi-spaced axial grooves 21a which cooperate with the axial grooves 22a of valve rotor 22 in response to relative rotation of the shafts 11 and 24 to selectively connect an inlet port 26 to one of outlet ports 28 and 29 and to connect an exhaust port 27 to the other outlet port.

The power assisted steering apparatus also comprises a reaction mechanism associated with the servo valve assembly to effect a resistance to relative rotation between the input and output members in accordance with a hydraulic pressure applied thereto from a secondary hydraulic pump assembly. More particularly, the pinion shaft 11 has a cylinder portion 30 which is rotatably coupled within the valve housing 18 and connected to the valve sleeve 21 by means of the connecting pin 31 as described above. Formed in the cylinder portion 30 of pinion shaft 11 is a reaction cylinder chamber 33 in which an annular flange portion 34 of input shaft 24 is rotatably coupled to be applied with a hydraulic reaction force. A reaction piston 35 in the form of an annular member is axially slidably coupled within the reaction cylinder chamber 33 and opposed to the annular flange portion 34 of input shaft 24. The reaction piston 35 is coupled over the inner end portion of input shaft 24 to subdivide the interior of cylinder chamber 33 into left and right chambers. The axial movement of reaction piston 35 is guided by engagment with an axial pin 38 fixed to the pinion shaft 11. The left chamber in cylinder portion 30 is in open communication with an inlet port 40 to be applied with a hydraulic reaction pressure, while the right chamber in cylinder portion 30 is in open communication with an exhaust port 41 connected to a fluid reservoir 80.

The annular flange portion 34 of input shaft 24 has an end face which is formed with a plurality of circumferentially equi-spaced recesses 34a, while the reaction piston 35 has an end face which is formed with a plurality of circumferentially equi-spaced recesses 35a which correspond with the opposed recesses 34a. A plurality of balls 36 are contained within the respective recesses 34a and 35a and supported by an annular retainer plate 37. In such an arrangement, the reaction piston 35 is loaded by an annular waved spring washer 39 toward the annular flange portion 34 of input shaft 24 and pressed in contact with the balls 36.

As is schematically illustrated in FIG. 1, the inlet port 26 of the servo valve assembly 20 is connected to a primary hydraulic pump assembly 50a. More particularly, inlet port 26 is connected to the discharge port of a primary hydraulic pump 50 through a first electromagnetic flow quantity control valve 51 including a variable throttle. The primary hydraulic pump 50 is arranged to be driven by a prime mover of the vehicle. A bypass valve 52 is connected in parallel with the flow quantity control valve 51 to maintain the difference in pressure between the opposite sides of the flow quantity control valve at a constant level. The inlet port 40 of the reaction cylinder chamber is connected to a secondary hydraulic pump assembly 55a. More particularly, inlet port 40 is connected to the discharge port of a secondary hydraulic pump 55 through a fixed throttle 56. The secondary hydraulic pump 55 is associated with the primary hydraulic pump 50 to be driven by the prime mover of the vehicle, as will be described in detail later. A bypass valve 57 is connected in parallel with the fixed throttle 56 to maintain the difference in pressure between the opposite sides of the fixed throttle 56 at a constant level. The inlet port 40 of the reaction cylinder chamber is further connected to the fluid reservoir 80 through a second electromagnetic flow quantity control valve 58.

Figure 2:
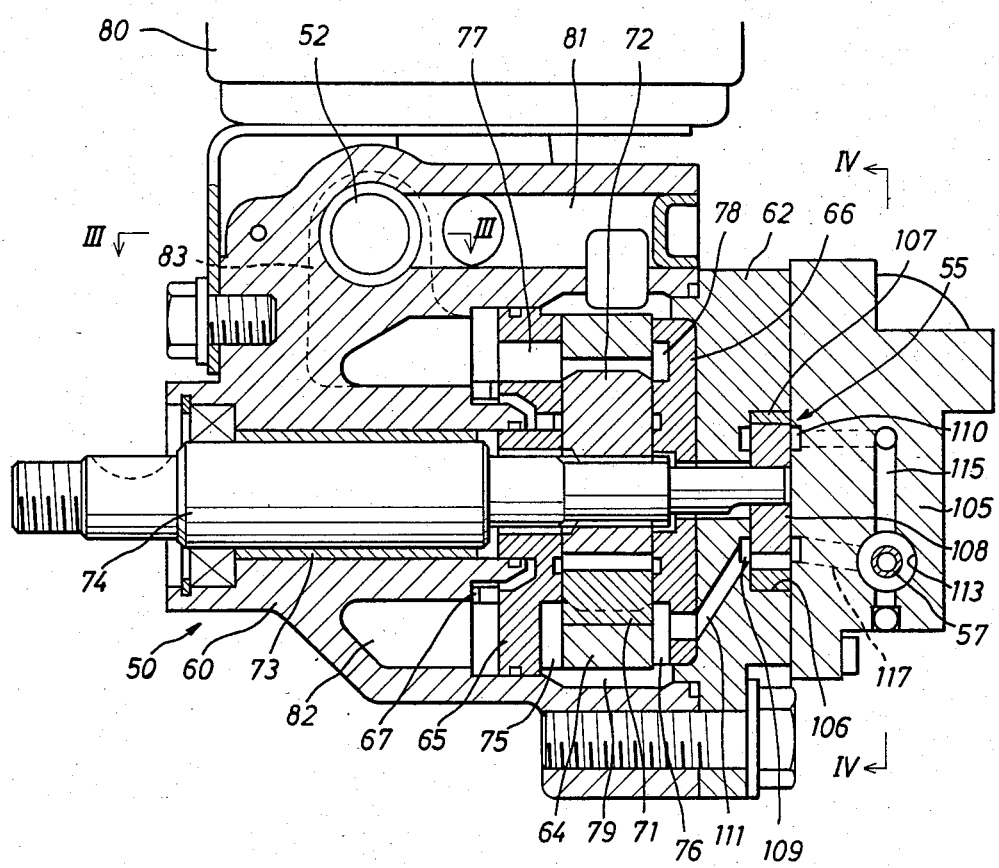
FIG. 2 is a sectional view of a hydraulic pump assembly in accordance with the present invention, in which the primary and secondary hydraulic pumps are unitedly assembled.
Figure 3:
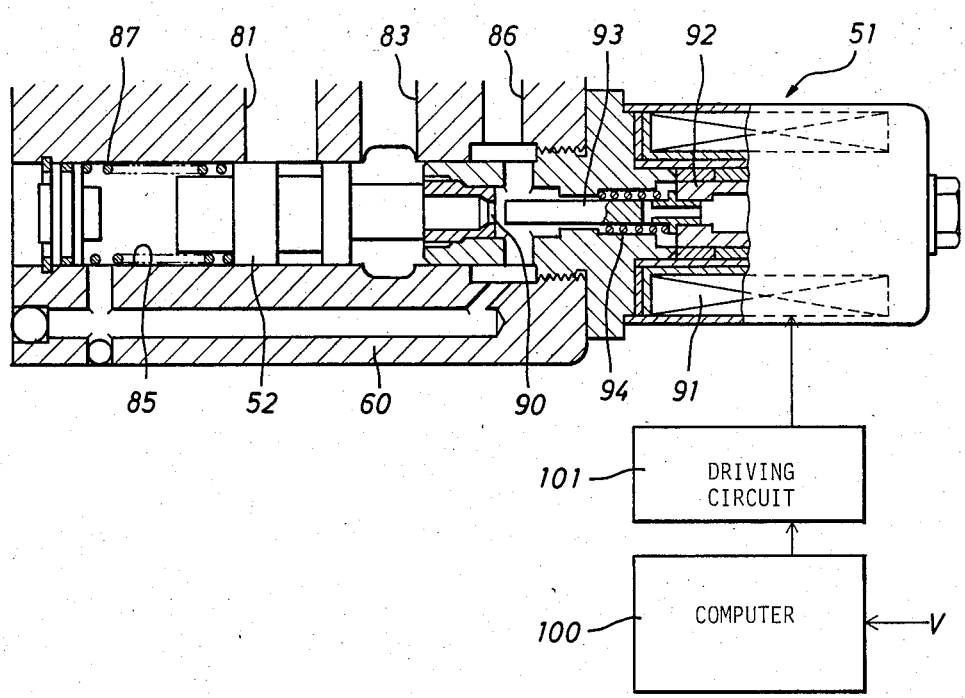
FIG. 3 is a sectional view taken along line III—III in FIG. 2.
Figure 4:
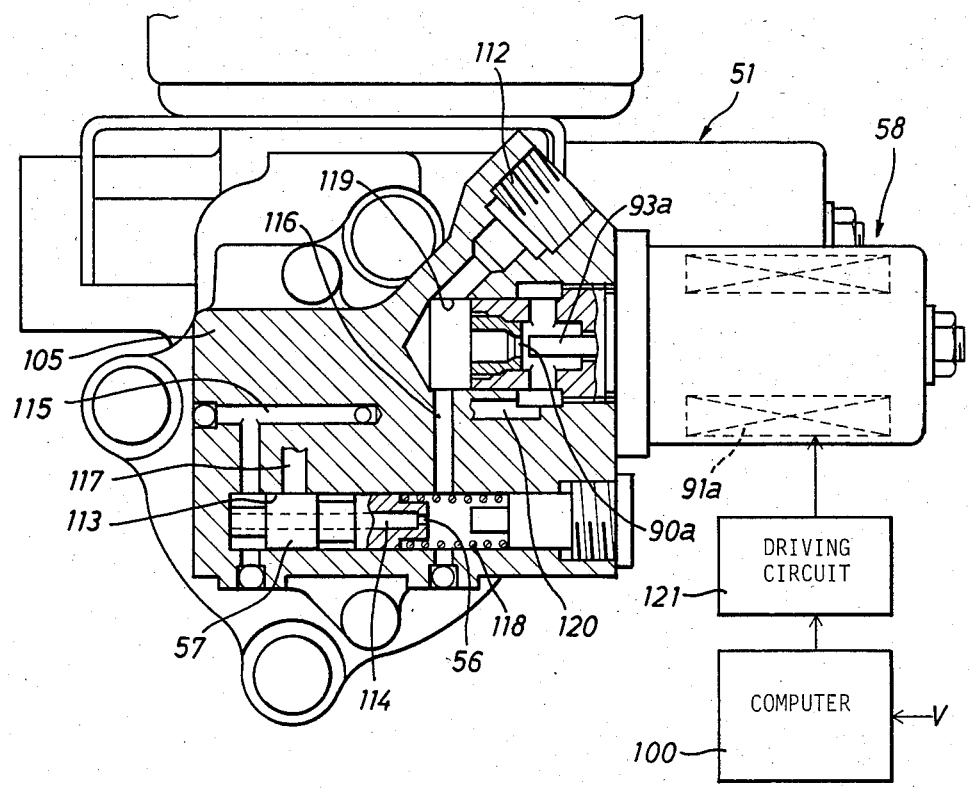
FIG. 4 is a sectional view taken along line IV—IV in FIG. 2.

As is illustrated in FIGS. 2 to 4, the secondary hydraulic pump 55, the first and second electromagnetic flow quantity control valves 51 and 58, the bypass valves 52 and 57, and the fixed throttle 56 are assembled within a pump housing 60 for the primary hydraulic pump 50. As can be well seen in FIG. 2, the pump housing 60 is formed therein with a hollow chamber which is closed by an end cover 62 in a fluid-tight manner. The primary hydraulic pump 50 includes a cam ring 64 contained within the hollow chamber, and a pair of side plates 65 and 66 attached to the opposite ends of cam ring 64. The cam ring 64 and the side plates 65 and 66 are in engagement with each other under load of an annular waved spring washer 67 disposed between the inner wall of pump housing 60 and the side plate 65. The cam ring 64 and the side plates 65 and 66 are further fixed in position by means of a positioning pin (not shown) carried at its opposite ends on the pump housing 60 and the end cover 62. The cam ring 64 is formed at its inner circumference with an oval cam surface. Within a pump cavity enclosed between the cam ring 64 and the side plates 65 and 66, a rotor 72 is fixedly mounted on a drive shaft 74 which is journalled on the pump housing 60 through a bearing sleeve 73. Thus, the rotor 72 is rotated within the pump cavity such that it makes contact with a pair of opposed portions of the cam surface of ring 64. The rotor 72 is formed with radial slots extending thereacross and opening in the ends of rotor 72. A plurality of sliding vanes 71 are mounted in the radial slots of rotor 72. During rotation of the rotor 72, the vanes 71 are moved radially outwardly from the rotor 72 responsive to centrifugal force and guided by the cam surface of ring 64 to form suction and compression or delivery chambers.

The side plate 65 is formed with a suction port 75 and a discharge port 77 which are opposed to one end face of rotor 72. The side plate 66 is formed with a suction port 76 and a discharge port 78 which are opposed to the other end face of rotor 72. The suction ports 75 and 76 are in open communication with an annular groove 79 in surrounding relationship with the cam ring 64. The annular groove 79 communicates with a bypass passage 81 which communicates into the fluid reservoir 80. The discharge ports 77 and 78 are in open communication with a pressure chamber 82 which communicates with a discharge passage 83.

As is illustrated in FIG. 3, the pump housing 60 is formed with a lateral bore 85 which is in open communication with the bypass passage 81, the discharge passage 83 and a communication passage 86 in connection to the inlet port 26 of servo valve assembly 20. A casing for the first electromagnetic flow quantity control valve 51 is threaded into the lateral bore 85 of pump housing 60 and is provided therein with a throttle passage 90 which is located between the discharge passage 83 and the communication passage 86. The first electromagnetic flow quantity control valve 51 includes a solenoid winding 91, a movable spool 92 to be displaced by energization of the solenoid winding 91, and a valve shaft 93 integrally connected to the spool 92 to control the opening degree of throttle passage 90 in accordance with displacement of the spool 92. The movable spool 92 is urged by a compression coil spring 94 rightwardly to maximize the opening degree of throttle passage 90 during deenergization of the solenoid winding 91. When the spool 92 is displaced by energization of the solenoid winding 91 against the spring 94, the valve shaft 93 acts to decrease the opening area of throttle passage 90 in accordance with displacement of the spool 92.

The lateral bore 85 of pump housing 60 contains therein a bypass valve 52 which is urged by a compression coil spring 87 toward the throttle passage 90 to interrupt the communication between the bypass passage 81 and the discharge passage 83 in its initial position. The bypass valve 52 is applied at the opposite ends thereof with hydraulic pressures appearing at the opposite sides of throttle passage 90. Thus, the bypass valve 52 controls the opening of bypass passage 81 to maintain the difference in pressure between the opposite sides of throttle passage 90 at a constant level. The solenoid winding 91 is connected to a driving circuit 101 which is connected to a computer 100 to produce a control current I in accordance with the vehicle speed V. When the solenoid winding 91 is energized by the control current I from the driving circuit 101, the movable spool 92 is displaced by energization of the solenoid winding 91 against the spring 94 such that the valve shaft 93 acts to decrease the opening area of throttle passage 90 in accordance with increase of the control current I. As a result, the quantity of fluid supplied into the inlet port 26 is decreased in accordance with increase of the vehicle speed.

As is illustrated in FIG. 2, a pump block 105 is secured in a fluid tight manner to the outer end of end cover 62 to form a pump chamber 106 eccentrically to the axis of the drive shaft 74. The secondary hydraulic pump 55 is in the form of a trochoid pump which includes an outer rotor 107 with internal teeth contained within the pump chamber 106 and an inner rotor 108 with external teeth contained within the outer rotor 107 and in mesh with the internal teeth of the outer rotor 107. The outer rotor 107 is rotatable within the pump chamber 106, and the inner rotor 108 is fixedly mounted on the drive shaft 74 for rotation therewith. One side wall of pump chamber 106 is formed with a suction port 109 in open communication with the suction port 76 through a communication passage 111, while the other side wall of pump chamber 106 is formed with a discharge port 110.

As is illustrated in FIG. 4, the pump block 105 is formed therein with a lateral bore 113 in which the bypass valve 57 is axially movably assembled. The bypass valve 57 is formed therein with an axial passage 114 and the fixed throttle 56. A pair of chambers subdivided by the bypass valve 57 are communicated to each other through the fixed throttle 56. One of the chambers is connected to the discharge port 110 through a discharge passage 115, and the other chamber is connected through a passage 116 to an outlet port 112 which is in connection to the inlet port 40 of the reaction cylinder chamber 33. The lateral bore 113 is further in open communication with a bypass passage 117 which is connected to the suction port 109. The bypass valve 57 is urged by a compression coil spring 118 toward the left end of lateral bore 113 to normally interrupt the communication between the discharge passage 115 and the bypass passage 117. When the bypass valve 57 is displaced rightward against spring 118, the bypass passage 117 is connected to the discharge passage 115 to bypass a portion of fluid discharged from the secondary hydraulic pump 55 to the fluid reservoir 80.

The pump block 105 is further formed with a lateral bore 119 which is located at an intermediate portion of the passage 116. A casing for the second electromagnetic flow quantity control valve 58 is threaded into the lateral bore 119 and secured to the pump block 105 in a fluid-tight manner. The casing for flow quantity control valve 58 is provided therein with a throttle passage 90a which communicates at one side thereof with the passage 116 and at the other side thereof with the suction port 109 through a drain passage 120. The second electromagnetic flow quantity control valve 58 includes a valve shaft 93a which is displaced in response to energization of a solenoid winding 91a to control the opening degree of throttle passage 90a. When the opening degree of throttle passage 90a is decreased by displacement of the valve shaft 93a, there will occur a hydraulic pressure in the passage 116 in accordance with the throttle resistance. The solenoid winding 91a is connected to a driving circuit 121 which is connected to the computer 100 to produce a control current in accordance with the vehicle speed V. When supplied with the control current from the driving circuit 121, the solenoid winding 91a is energized to effect displacement of the valve shaft 93a toward the throttle passage 90a in accordance with increase of the control current. As a result, the hydraulic pressure in the reaction chamber 33 is increased in accordance with increase of the vehicle speed V. The other construction of flow quantity control valve 58 is substantially the same as the first electromagnetic flow quantity control valve 51.

In operation, the drive shaft 74 is driven by the prime mover of the vehicle to rotate the rotor 72 and the inner rotor 108. Thus, the primary and secondary pumps 50 and 55 are operated in proportion to rotation of the prime mover to discharge fluid under pressure respectively into the discharge passages 83 and 115. The fluid under pressure in passage 83 is controlled by the bypass valve 52 and supplied into the inlet port 26 of servo valve assembly 20 through the throttle passage 90. On the other hand, the fluid under pressure in passage 115 is controlled by the bypass valve 57 and supplied into the passage 116. The fluid under pressure in passage 116 flows into the suction port 109 through the throttle passage 90a and the drain passage 120.

When the vehicle travels at a low speed, the driving circuits 101 and 121 each are in a deactivated condition to maintain the respective solenoid windings 91 and 91a of flow quantity control valves 51 and 58 in their deenergized conditions. In such a condition, the valve shaft 93 of flow quantity control valve 51 is in its initial position to maximize the opening area of throttle passage 90, while the valve shaft 93a of flow quantity control valve 58 is also in its initial position to maximize the opening area of throttle passage 90a. Thus, the flow quantity of fluid supplied into the inlet port 26 of servo valve assembly 20 is maintained in a maximum value to provide a sufficient hydraulic power assist to the driver's steering effort. On the other hand, the throttle passage 90a does not cause any hydraulic back pressure in passage 116, and the reaction piston 35 is pressed into contact with the balls 36 only by the biasing force of spring washer 39 to permit relative rotation of the valve sleeve 21 and the valve rotor 22 in response to rotation of the input member 24.

Figure 5:
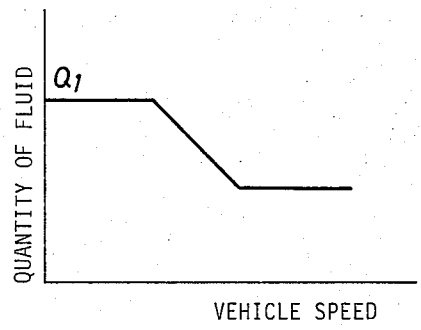
FIG. 5 is a graph illustrating a quantity of fluid supplied into a servo valve assembly in the power assisted steering apparatus in relation to a vehicle speed.
Figure 6:
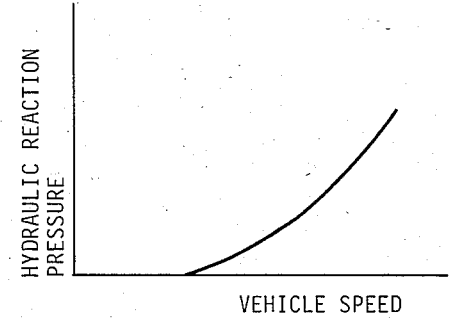
FIG. 6 is a graph illustrating a hydraulic reaction pressure applied to a reaction mechanism in the power assisted steering apparatus in relation to a vehicle speed.

When the vehicle speed exceeds a predetermined level, the driving circuits 101 and 121 are activated under control of the computer 100 to produce a control current in proportion to increase of the vehicle speed, respectively. In such a condition, the solenoid winding 91 of flow quantity control valve 51 is energized by the control current to displace the valve shaft 93 toward the throttle passage 90 in accordance with increase of the vehicle speed. As a result, the opening area of throttle passage 90 is decreased by the valve shaft 93 to decrease the quantity of fluid supplied into the inlet port 26 of servo valve assembly 20 as shown in FIG. 5. On the other hand, the solenoid winding 91a of flow quantity control valve 58 is energized by the control current to displace the valve shaft 93a toward the throttle passage 90a in accordance with increase of the vehicle speed. As a result, the opening area of throttle passage 90a is decreased by the valve shaft 93a to cause a hydraulic back pressure in passage 116 so as to increase the pressure acting on the reaction piston 35 as shown in FIG. 6. Thus, the reaction piston 35 acts to increase the resistance to relative rotation between the valve sleeve 21 and the valve rotor 22 in proportion to increase of the vehicle speed.

Although in the above embodiment the quantity of fluid supplied into the servo valve assembly 20 is controlled to be decreased in accordance with increase of the vehicle speed, the fluid quantity may be maintained in a constant amount. Furthermore, the computer 100 may be arranged to control the control current in accordance with other parameters such as rotation angle and speed of the steering wheel. In such a case, the hydraulic pressure acting on reaction piston 35 can be controlled in accordance with the driver's effort applied to the steering wheel.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power assisted steering system for an automotive vehicle having a primary hydraulic pump assembly driven by a prime mover of the vehicle for supply of fluid under pressure, a secondary hydraulic pump assembly for supply of fluid under pressure in proportion to the vehicle speed, a hydraulic power cylinder operatively connected to the steerable road wheels of the vehicle, a servo valve assembly including an input member operatively connected to the steering wheel of the vehicle, an output member operatively connected to said power cylinder, valve means for controlling the supply of fluid under pressure from said primary hydraulic pump assembly to said power cylinder in response to relative rotation between said input and output members, and a reaction mechanism associated with said servo valve assembly and connected to said secondary hydraulic pump assembly to effect a resistance to relative rotation between said input and output members in accordance with a hydraulic pressure applied thereto from said secondary hydraulic pump assembly, wherein said secondary hydraulic pump assembly is unitedly assembled with said primary hydraulic pump assembly to be driven by the prime mover of the vehicle and comprises first control valve means for controlling the quantity of fluid applied to said reaction mechanism from said secondary hydraulic pump assembly in a constant amount, and second control valve means for controlling the pressure of fluid controlled by said first control valve means in accordance with the vehicle speed.

2. A power assisted steering system as claimed in claim 1, wherein said primary hydraulic pump assembly comprises a pump housing, a drive shaft rotatably mounted within said pump housing and arranged to be driven by the prime mover of the vehicle, and a primary hydraulic pump rotor contained within said pump housing and mounted on said drive shaft, and wherein said secondary hydraulic pump assembly comprises a pump block secured to the outer end of said pump housing to form a pump chamber, and a secondary hydraulic pump rotor contained within said pump chamber and mounted on said drive shaft.

3. A power assisted steering system as claimed in claim 2, wherein said first and second control valve means are arranged within said pump block of said secondary hydraulic pump assembly.

4. A power assisted steering system as claimed in claim 3, wherein said first control valve means comprises a spring loaded bypass valve formed therein with an axial passage and a fixed throttle, said bypass valve being disposed between a discharge passage in communication with a discharge port of said secondary pump chamber and a bypass passage in communication with a suction port of said secondary pump chamber, and said fixed throttle of said bypass valve being arranged to throttle the flow of fluid passing there-through toward said reaction mechanism from said discharge passage through said axial passage, and further wherein said second control valve means is disposed within a communication passage between said fixed throttle of said bypass valve and an inlet port of said reaction mechanism.

5. A power assisted steering system as claimed in claim 4, wherein said second control valve means is an electromagnetic flow quantity control valve arranged to be energized by a control current in proportion to the vehicle speed and to bypass the flow of fluid supplied through said fixed throttle of said bypass valve to a fluid reservoir in accordance with the value of said control current.

6. A power assisted steering system as claimed in claim 5, wherein said bypass valve and said electromagnetic flow quantity control valve are arranged in parallel to each other in said pump block of said secondary pump assembly.

* * * * *